(12) United States Patent
Hasegawa et al.

(10) Patent No.: US 8,793,015 B2
(45) Date of Patent: Jul. 29, 2014

(54) CONTROL METHOD FOR LEGGED MOBILE ROBOT

(75) Inventors: Tadaaki Hasegawa, Wako (JP); Naohide Ogawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 1860 days.

(21) Appl. No.: 11/572,541

(22) PCT Filed: Jul. 28, 2005

(86) PCT No.: PCT/JP2005/013839
§ 371 (c)(1),
(2), (4) Date: Jan. 23, 2007

(87) PCT Pub. No.: WO2006/013778
PCT Pub. Date: Feb. 9, 2006

(65) Prior Publication Data
US 2007/0260354 A1    Nov. 8, 2007

(30) Foreign Application Priority Data
Aug. 2, 2004 (JP) .................... 2004-225663

(51) Int. Cl.
*B25J 13/00* (2006.01)
*B25J 5/00* (2006.01)
B25J 13/08 (2006.01)
G06F 19/00 (2011.01)

(52) U.S. Cl.
USPC ............................................. 700/245; 901/2

(58) Field of Classification Search
USPC ............. 318/568.12, 570; 700/245, 252, 260; 901/2
IPC ... B25J 5/00,13/00; B62D 57/032; G05B 13/04
See application file for complete search history.

(56) References Cited

U.S. PATENT DOCUMENTS

2004/0176875 A1 * 9/2004 Iribe et al. .................... 700/245

FOREIGN PATENT DOCUMENTS

| JP | 10-230485 | 9/1998 |
| JP | 2003-326483 | 11/2003 |
| JP | 2004-209614 | 7/2004 |
| JP | 2006007376 A * | 1/2006 |

OTHER PUBLICATIONS

Harada, K.; Kajita, S.; Kanehiro, F.; Fujiwara, K.; Kaneko, K.; Yokoi, K.; Hirukawa, H., "Real-time planning of humanoid robot's gait for force controlled manipulation," Robotics and Automation, pp. 616-622 vol. 1, Apr. 26-May 1, 2004.*

* cited by examiner

*Primary Examiner* — Khoi Tran
*Assistant Examiner* — Dale Moyer
(74) *Attorney, Agent, or Firm* — Rankin, Hill & Clark LLP

(57) ABSTRACT

A control method for a legged mobile robot includes exercising a body of a robot such that a center of gravity of the robot obtains a momentum or the body obtains an angular momentum in a direction in which an object is to be moved while restraining a force from being applied to the object from the robot in a state wherein the robot opposes the object, and applying a force to the object from a hand of an arm body provided in the body of the robot so as to start moving the object in a state wherein the center of gravity has obtained the momentum or the body has an angular momentum. With this arrangement, when moving an object by a robot, a motion of the robot can be smoothly changed while preventing a significant change in ZMP before and after starting to move the object.

12 Claims, 5 Drawing Sheets

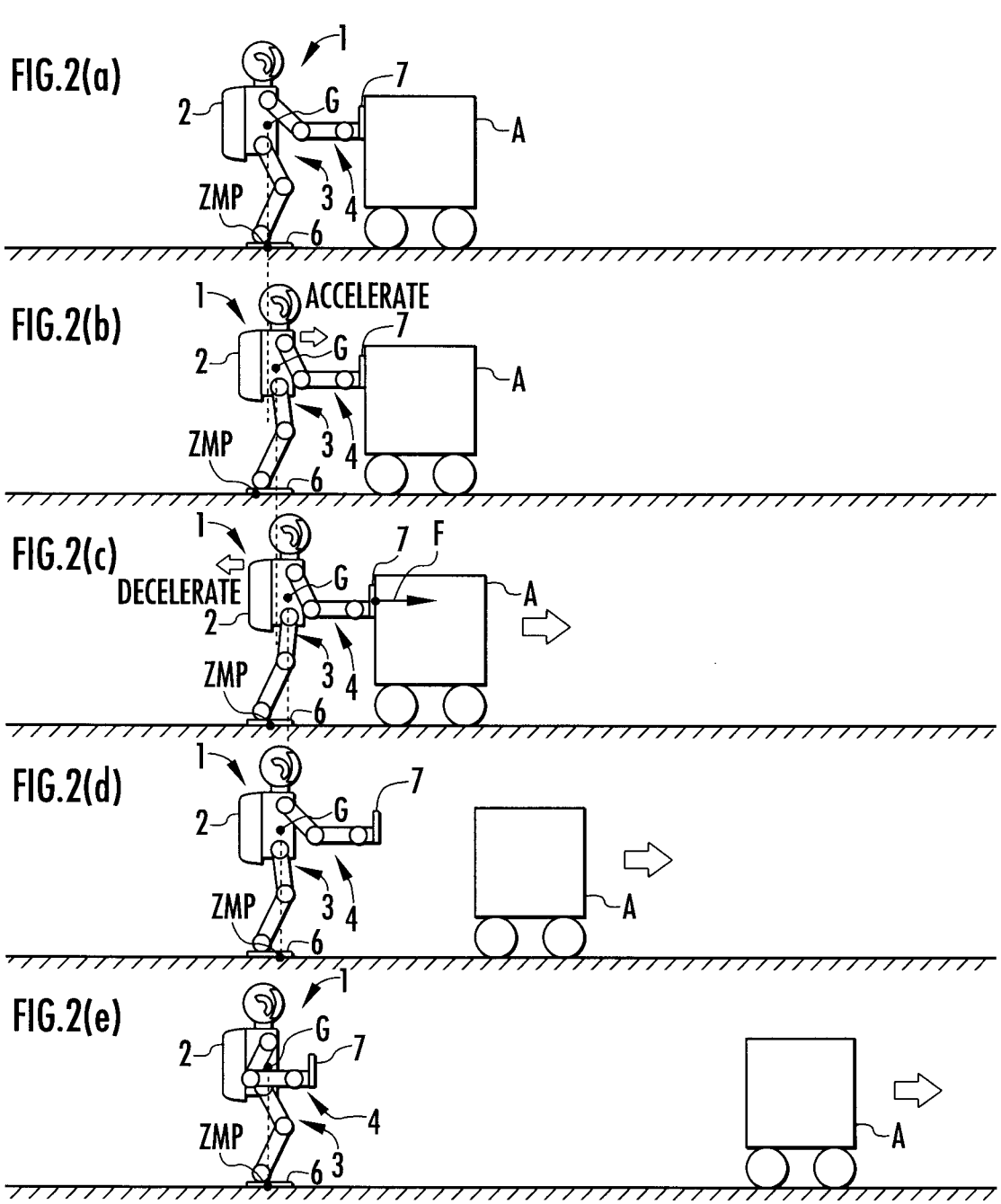

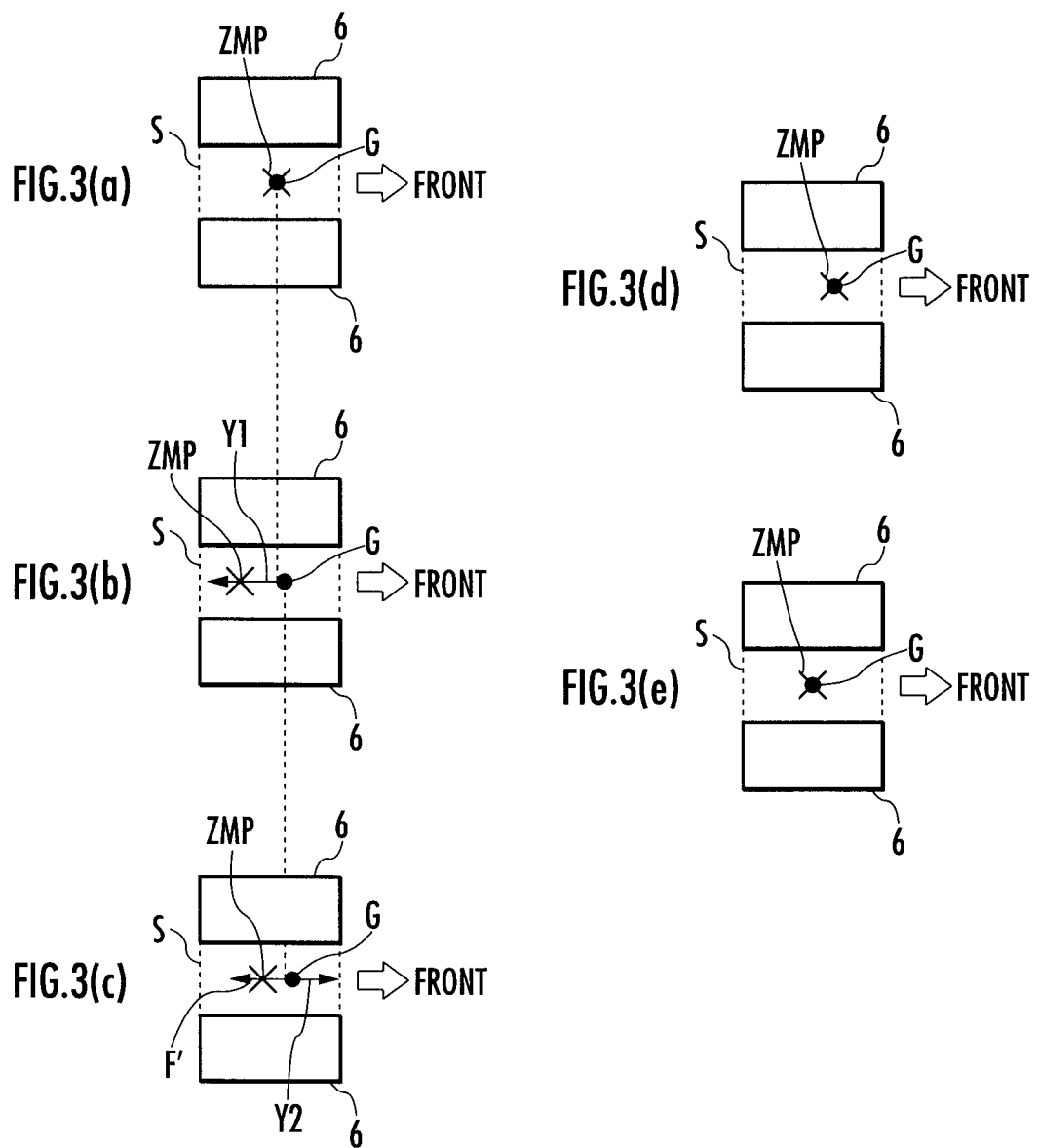

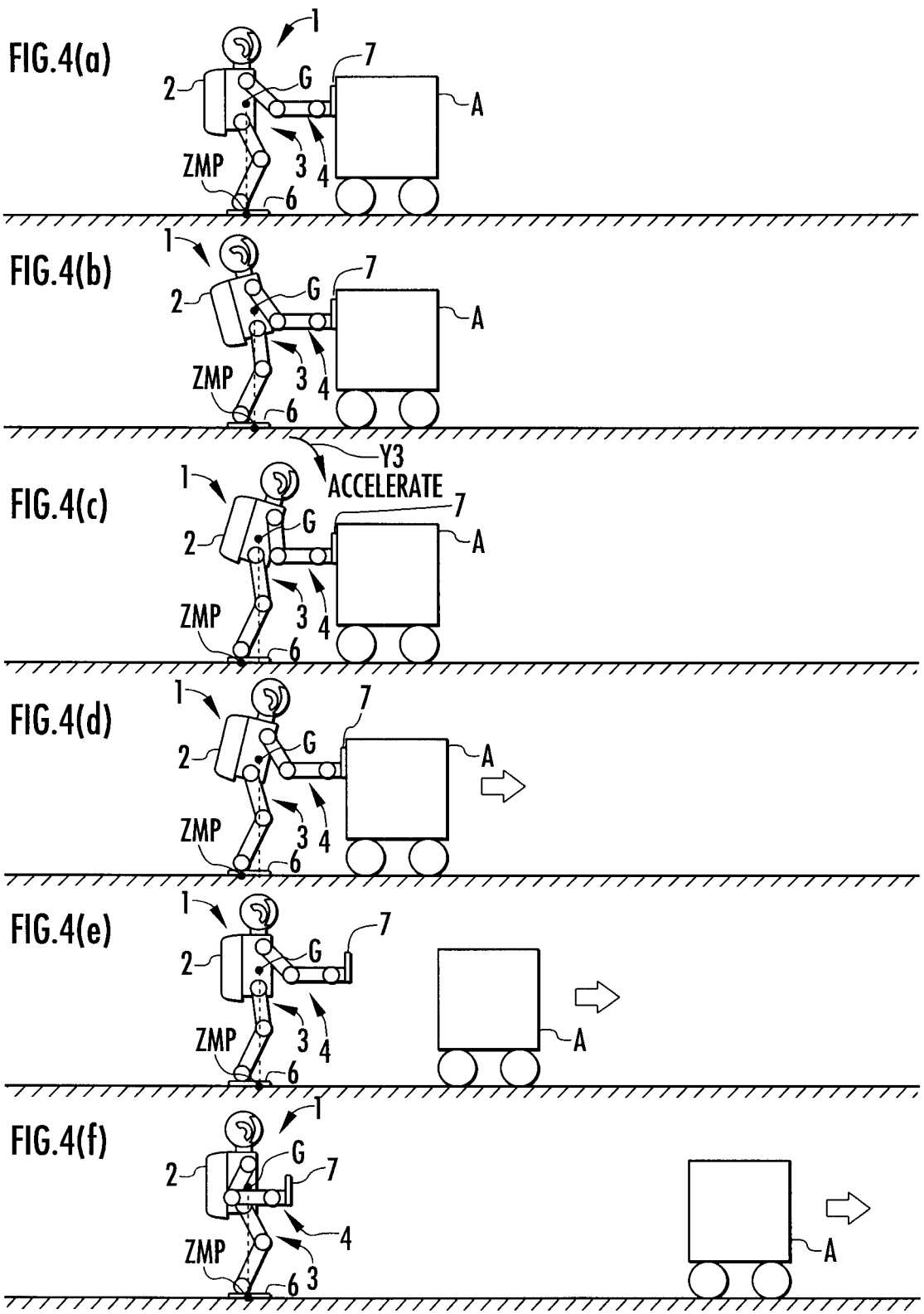

CONTROL METHOD FOR LEGGED MOBILE ROBOT

TECHNICAL FIELD

The present invention relates to a control method for a legged mobile robot and, more particularly, to a control method for moving a certain object by the robot.

BACKGROUND ART

As a technology for moving an object by a legged mobile robot, there has been known a technology disclosed in, for example, Japanese Unexamined Patent Application Publication No. H10-230485 by the present applicant (hereinafter referred to as patent document 1).

According to the technology, a desired gait is generated such that a dynamic balance condition that a component (horizontal component), excluding a vertical component, of a moment produced about a desired ZMP (a desired floor reaction force central point) by a resultant force of an inertial force produced due to a motion of a robot and the gravity and an external force acting on the robot is zero (a floor reaction force acting on the desired floor reaction force central point and the aforesaid resultant force are balanced with each other) is satisfied.

According to the technology disclosed in Patent Document 1 mentioned above, before an operation of, for example, pushing an object, is begun, a reaction force (an external force) received by a robot from the object is zero; therefore, a gait is generated such that the horizontal component of a moment produced about a desired ZMP by a resultant force of an inertial force produced due to a motion of the robot and the gravity is zero. Then, from the moment the operation of pushing the object is started, a gait is generated such that the horizontal component of a moment produced about the desired ZMP by a resultant force of the inertial force, the gravity, and a non-zero external force is zero.

Thus, when the operation of pushing the object is begun, a sudden change in an external force causes a sudden change in a ZMP. This has been leading to a danger that it becomes difficult to smoothly change a motion state of the robot before and after pushing the object so that the ZMP falls within a proper range of a ground contact surface (more specifically a so-called supporting polygon), resulting in a difficulty of securing stability of the robot. Here, the supporting polygon is a smallest convex polygon that includes the ground contact surface of the robot.

As a possible solution, for instance, before starting the operation of pushing the object, the robot (a bipedal mobile robot in this case) may be set to an inclining-forward posture so as to make the distal portions of the arm bodies thereof (more generally a portion to be engaged with the object to push the object) come in contact with the object and the robot may be also caused to land with the two leg bodies thereof longitudinally spread, considering changes in ZMP attributable to reaction forces acting on the robot. Then, in this state, it would be possible to apply a force to the object through the intermediary of the arm bodies. In this case, longitudinally spreading the two leg bodies would increase the length of the supporting polygon in a direction in which the object is to be moved; therefore, adding a force to the object from the robot would make it possible for a ZMP to remain in a proper range even if the ZMP suddenly changes, thus allowing the robot to push the object while maintaining the stability of the robot.

Doing as described above, however, would require special operation control for setting the posture of the robot as described above before starting the operation of pushing an object. Hence, the operation of pushing the object cannot be quickly started. Furthermore, in a situation wherein only one leg body of the robot is in contact with the ground, it would be difficult to start the operation of pushing the object.

The present invention has been made in view of the background described above, and it is an object thereof to provide a control method that makes it possible to smoothly change motions of a robot while preventing a ZMP from significantly changing before and after an object is moved by the robot.

DISCLOSURE OF INVENTION

To fulfill such an object, a first invention of a control method for a legged mobile robot in accordance with the present invention is a control method for causing a robot to perform an operation for moving an object by a legged mobile robot equipped with a plurality of leg bodies extended from a body thereof, including: a first step for exercising the body of the robot such that the center of gravity of the robot obtains a momentum in a direction in which the object is to be moved while restraining a force from being applied to the object from the robot in a state wherein the robot opposes the object; and a second step for applying a force to the object from a predetermined portion provided in the body of the robot so as to start moving the object in a state wherein the center of gravity has acquired the momentum.

According to the first invention described above, in the aforesaid first step, an acceleration motion of the body of the robot is carried out to impart a momentum (a translational momentum) to the center of gravity of the robot. In this case, although an inertial force is produced due to the motion of the center of gravity, a force is not applied to the object from the robot (a force applied to the object from the robot is zero or substantially zero), so that a reaction force received by the robot from the object will be substantially zero. Further, in the first step, a momentum may be imparted to the center of gravity of the robot in a state wherein the robot hardly receives a reaction force from the object; hence, it is unnecessary to increase much the magnitude of a motional acceleration of the body, i.e., a motional acceleration of the center of gravity. Hence, in the first step, a ZMP can be easily maintained within a supporting polygon, which is a smallest convex polygon that includes a ground contact surface (the ground contact surfaces of the leg bodies) of the robot. In the present description, a ZMP means a point on a floor surface at which a horizontal component of a moment generated about the point by a resultant force of an inertial force generated by a motion of a robot (a motion of the center of gravity), the gravity acting on the robot, and a reaction force received by the robot from an object is zero.

In the aforesaid second step following the first step, the force is applied to the object from the predetermined portion of the robot in the state wherein the center of gravity of the robot has the momentum; hence, it is possible to start moving the object while generating, about the center of gravity of the robot, an inertial force that is in the opposite direction from that of the reaction force received by the robot from the object (in other words, while reducing the momentum of the center of gravity of the robot by the reaction force). Thus, when moving the object is started by applying the force to the object from the robot, the sum (vector sum) of the reaction force received by the robot from the object and the inertial force of the center of gravity in the opposite direction therefrom can be reduced. This makes it possible to prevent the ZMP from deviating out of the aforesaid supporting polygon or deflecting to an edge of the supporting polygon, permitting the ZMP to easily fall within the supporting polygon, as in the case of the first step.

Thus, according to the present invention, when moving an object, a motion of a robot can be smoothly changed while restraining a ZMP from suddenly changing before an object is started to be moved (the first step) and after the object is started to be moved (the second step) without the need for controlling the robot to a special posture for expanding a supporting polygon, i.e., a range in which the ZMP can exist, in the direction in which the object is to be moved.

The first invention described above utilizes a momentum of a translational motion of the center of gravity of the robot; alternatively, however, an angular momentum may be utilized. More specifically, a second invention of the control method for a legged mobile robot in accordance with the present invention is a control method for causing a legged mobile robot equipped with a plurality of leg bodies extended from a body thereof to perform an operation for moving an object, the control method including: a first step for exercising the body of the robot such that the body of the robot obtains an angular momentum about the center of gravity of the robot in the direction in which the object is to be moved while preventing a force from being applied to the object from the robot in a state wherein the robot opposes the object; and a second step for starting to move the object by applying a force to the object from a predetermined portion provided in the body of the robot in a state wherein the angular momentum has been imparted to the body.

According to the second invention, in the first step, a motion for changing the posture of the body of the robot (a motion for inclining the body that involves angular acceleration) is carried out to impart the angular momentum about the center of gravity of the robot to the body. In this case, although an inertial force is generated due to the motion for changing the posture of the body of the robot, a force is not applied to the object from the robot, so that a reaction force received by the robot from the object will be zero or substantially zero, as in the first invention described above. Further, in the first step, the angular momentum may be imparted to the body of the robot in a state wherein the robot is hardly subjected to a reaction force from the object, obviating the need for increasing much the angular acceleration of the body. Hence, in the first step, a ZMP can be easily maintained within the aforesaid supporting polygon, as with the first invention.

Further, in the second step following the first step, the force is applied to the object from the predetermined portion of the robot in the state wherein the body of the robot is provided with the angular momentum, thus making it possible to begin moving the object while reducing the angular momentum about the center of gravity of the body of the robot by the reaction force that the robot receives from the object. Hence, when the object is started to be moved by applying the force from the robot to the object, the sum (vector sum) of a moment generated about the center of gravity of the robot by the reaction force that the robot receives from the object and the inertial force (moment) due to the angular acceleration of the body in the opposite direction from the aforesaid moment (deceleration of the angular velocity) can be reduced. This makes it possible to prevent the ZMP from deviating from the aforesaid supporting polygon or deflecting to an edge of the supporting polygon, thus permitting the ZMP to easily fall within the supporting polygon, as in the case of the first step.

Thus, according to the second invention, as with the first invention, when moving an object, a motion of a robot can be smoothly changed while restraining a ZMP from suddenly changing before the object is started to be moved (the first step) and after the object is started to be moved (the second step) without the need for controlling the robot to a special posture for expanding a supporting polygon, i.e., a range in which the ZMP can exist, in the direction in which the object is to be moved.

Further, the first invention and the second invention may be combined so as to use both the momentum of a translational motion of the center of gravity of a robot and the angular momentum of the body. More specifically, a third invention of the control method for a legged mobile robot in accordance with the present invention is a control method for causing a legged mobile robot equipped with a plurality of leg bodies extended from a body thereof to move an object, the control method including: a first step for exercising the body of the robot such that the center of gravity of the robot obtains a momentum in a direction in which the object is to be moved and also the body of the robot obtains an angular momentum in the direction in which the object is to be moved while preventing a force from being applied to the object from the robot in a state wherein the robot opposes the object; and a second step for starting to move the object by applying a force to the object from a predetermined portion provided in the body of the robot in a state wherein the momentum has been imparted to the center of gravity of the robot and the angular momentum has been imparted to the body thereof.

According to the third invention described above, in the first step, although the acceleration motion (translational accelerating motion) of the center of gravity of the robot and the angular acceleration motion of the body thereof will be carried out, these motions are carried out in a state wherein the robot hardly receives a reaction force from the object. Hence, as with the first invention and the second invention, in the first step, a ZMP can be easily maintained within a supporting polygon, which is a smallest convex polygon that includes a ground contact surface (the ground contact surfaces of the leg bodies) of the robot.

Further, in the second step following the first step, the force is applied to the object from the predetermined portion of the robot in the state wherein the center of gravity of the robot has the translational momentum and the body thereof has the angular momentum. Hence, as with the first invention and the second invention, when the object is started to be moved by applying the force from the robot to the object, it is possible to prevent the ZMP from deviating from the aforesaid supporting polygon or deflecting to an edge of the supporting polygon, thus permitting the ZMP to easily fall within the supporting polygon, as in the case of the first step.

Thus, as with the first invention and the second invention described above, when moving an object, a motion of a robot can be smoothly changed while restraining a ZMP from suddenly changing before the object is started to be moved (the first step) and after the object is started to be moved (the second step) without the need for controlling the robot to a special posture for expanding a supporting polygon, i.e., a range in which the ZMP can exist, in the direction in which the object is to be moved.

In the first to the third inventions described above, if the predetermined portion is an arm body extended from the body and if the arm body is provided with at least one or more joints enabling the distance between the distal portion of the arm body and the body changeable, then the control method preferably includes a step for bringing at least the distal portion of the arm body into contact with the object before the first step, wherein the motion of the body in the first step is preferably carried out while the joint is being operated with at least the distal portion of the arm body in contact with the object (a fourth invention).

According to the fourth invention, in the first step, it is possible to impart a translational momentum to the center of gravity of a robot or impart an angular momentum to the body by performing a motion of the body of the robot in such a manner that a force will not be applied to the object from the robot by operating a joint of the arm body in the state wherein the distal portion of the arm body of the robot is in contact with the object. Specifically, in order to bring the body of the robot close to an object to move the object (e.g., to move the object by pushing it), the joint of the arm body may be operated such that the distance between the body and the distal portion of the arm body decreases. In order to move the body of the robot away from the object to move the object (e.g., to move the object by pulling it or to lift the object), the joint of the arm body may be operated such that the distance between the body and the distal portion of the arm body increases. Then, the force is applied from the arm body to the object in the second step, with the distal portion of the arm body in contact with the object, thus permitting smooth shift from the first step to the second step.

In the fourth invention described above, the step for bringing at least the distal portion of the arm body into contact with the object is preferably carried out in a state wherein a travel of the robot is at a halt (a fifth invention). With this arrangement, a series of operations that includes the operation for bringing the arm body into contact with the object and the subsequent first step and second step can be smoothly performed.

The first to the fifth inventions are ideally suited to a case where the number of the leg bodies is two, i.e., if the legged mobile robot is a bipedal mobile robot (a sixth invention).

Supplementally, in the present invention, moving an object is not limited to moving the object on a floor surface but it also includes moving of the object by lifting it off the floor surface.

BEST MODE FOR CARRYING OUT THE INVENTION

A first embodiment will be explained with reference to FIG. 1 to FIG. 3.

FIG. 1 is a diagram showing a side view of a schematic construction of a legged mobile robot according to the present embodiment. This robot 1 is a bipedal mobile robot equipped with two leg bodies 3, 3 extended downward from a body (base body) 2, two arm bodies 4, 4 extended from both right and left sides of the body 2 (in the direction that is perpendicular to the paper surface), and a head 5 supported on the upper end of the body 2. Since FIG. 1 is a side view, only the leg body 3 and the arm body 4 on the right side observed toward the front of the robot 1 are shown (the leg body and the arm body on the left side overlap the leg body 3 and the arm body 4 on the right side in the drawing).

Each leg body 3 is connected to the body 2 through the intermediary of a hip joint 3a, and has a knee joint 3b and an ankle joint 3c provided between a foot 6 at the distal portion of the leg body 3 and the hip joint 3a. These hip joint 3a, the knee joint 3b, and the ankle joint 3c are capable of rotating about one axis or a plurality of axes. For example, the hip joint 3a is capable of rotating about three axes, the knee joint 3b is capable of rotating about one axis, and the ankle joint 3c is capable of rotating about two axes. In this case, the foot 6 of each leg body 3 is capable of a motion of a six degree of freedom with respect to the body 2.

Each arm body 4 is connected to the body 2 through the intermediary of a shoulder joint 4a, and has an elbow joint 4b and a wrist joint 4c provided between a hand 7 at the distal portion of the arm body 4 and the shoulder joint 4a. These shoulder joint 4a, the elbow joint 4b, and the wrist joint 4c are capable of rotating about one axis or a plurality of axes. For example, the shoulder joint 4a is capable of rotating about three axes, the elbow joint 4b is capable of rotating about one axis, and the wrist joint 4c is capable of rotating about three axes. In this case, the hand 7 of each arm body 4 is capable of a motion of a seven degree of freedom with respect to the body 2. And, in each arm body 4, the distance between the hand 7, which is the distal portion of the arm body 4, and the body 2 can be changed by operating the joints 4a, 4b, or 4c. Incidentally, the arm bodies 4, 4 correspond to the predetermined portions in the present invention.

Supplementally, the degrees of freedom of the leg body 3 and the arm body 4 or the numbers of joints or the numbers of axes about which the joints rotate do not have to be always set as mentioned above; they may be set appropriately according to a motion mode or the like desired for the robot 1 to perform. For example, the arm body 4 may be provided with only one joint that makes the distance between the hand 7 (the distal portion) and the body 2 changeable.

The joints of the leg bodies 3 and the arm bodies 4 are provided with joint actuators (not shown), such as electric motors, and desired motions of the leg bodies 3 and the arm bodies 4 are carried out by driving the joint actuators. Further, a control unit 10 including a microcomputer and the like is installed in the body 2, and the control unit 10 controls the operations of the joint actuators and consequently the motions of the leg bodies 3 and the arm bodies 4.

Referring now to FIG. 2 and FIG. 3, the following will explain the control of operations of the robot 1 when performing an operation of moving a certain object, e.g., an operation of moving the object by pushing it, by the robot 1 in accordance with the present embodiment. FIGS. 2(a) to (e) are side views showing the positional relationship in time series between an object A (a carriage in the illustrated example) and the robot 1, and FIGS. 3(a) to (e) show in time series the horizontal positions of the center of gravity of the robot 1 and a ZMP in correspondence to FIGS. 2(a) to (e), respectively. FIGS. 3(a) to (e) indicate the ZMP by the "x" marks.

First, as shown in FIG. 2(a), the robot 1 is set to oppose the object A (such that the object A is right in front of the robot 1), and the hands 7, 7 of both arm bodies 4, 4 are placed in contact with the object A. In this case, the hands 7, 7 of both arm bodies 4, 4 are abutted against (brought in contact with) the object A such that a pushing force is not applied to the object A (such that the force applied to the object A from the robot 1 is substantially zero). In this example, both leg bodies 2, 2 of the robot 1 are continuously retained in contact with the ground in a state wherein they are laterally arranged in a line and a travel of the robot 1 is at a halt. In the example explained in the present embodiment, both leg bodies 2, 2 of the robot 1 are laterally arranged in line; however, the ground contact positions of the two feet 6, 6 may be longitudinally shifted.

In the state shown in FIG. 2(a), a center of gravity G of the robot 1 is substantially stationary and positioned above the feet 6, as observed sideways. In this state, the ZMP of the robot 1 is positioned vertically below the center of gravity G substantially at the center of a supporting polygon S, which is a smallest convex polygon that includes a ground contact surface of the robot 1 (the ground contact surfaces of both feet 6, 6), as shown in FIG. 3(a). In other words, in the state shown in FIG. 2(a), the posture of the robot 1 is controlled such that the ZMP is positioned as shown in FIG. 3(a) and the hands 7, 7 of the arm bodies 4, 4 touch the object A, as described above. Here, the ZMP of the robot 1 is a point on a floor surface at which the horizontal component of a moment generated about the point by a resultant force of an inertial force produced by a motion of the robot 1 (a motion of the center of gravity G), the gravity acting on the robot 1, and a reaction force received by the robot 1 from the object A (hereinafter referred to as the object reaction force in some cases) is zero, as described above. In the state shown in FIG. 2(*a*), the inertial force and the object reaction force are substantially zero, so that the point on the floor surface vertically below the center of gravity G provides the ZMP.

Subsequently, as shown in FIG. 2(*b*), with both feet 6, 6 maintained in contact with the ground, both leg bodies 3, 3 are actuated (the operations of the actuators of the joints 3*a* to 3*c* are controlled) so as to accelerate the body 2 forward (so as to bring the body 2 toward the object A while accelerating it). At this time, however, both arm bodies 4, 4 are actuated (the operations of the actuators of the joints 4*a* to 4*c* are controlled) such that both arm bodies 4, 4 do not apply a pushing force to the object A (such that a force applied to the object A from the robot 1 is substantially zero). In other words, both arm bodies 4, 4 are actuated such that the hands 7, 7 of both arm bodies 4, 4 are brought closer to the body 2 by accelerating the body 2 forward as much as the body 2 has moved closer toward the object A. Such an operation of the robot 1 shown in FIG. 2(*b*) corresponds to the operation of the first step in the first invention.

In the operational state shown in FIG. 2(*b*), the center of gravity G of the robot 1 is accelerated toward the front by the acceleration of the body 2 toward the front, so that an inertial force of the center of gravity G (an inertial force of a translational motion of the center of gravity G) is generated toward the rear of the robot 1, as indicated by an arrow Y1 in FIG. 3(*b*). An object reaction force that the robot 1 receives is substantially zero. Hence, the ZMP moves toward the rear side of a supporting polygon S that includes the ground contact surface of the robot 1 (the ground contact surfaces of both feet 6, 6), as shown in FIG. 3(*b*). The body 2 of the robot 1 is accelerated toward the front (consequently accelerating the center of gravity G toward the front) such that the ZMP falls within the supporting polygon S and does not incur a sudden change.

Subsequently, as shown in FIG. 2(*c*), an operation for moving the hands 7, 7 of both arm bodies 4, 4 forward (an operation for moving the hands 7, 7 away from the body 2) is begun, and the speed of the motion of the body 2 of the robot 1 toward the front is reduced while applying a force F forward from the robot 1 to the object A. This begins the operation for pushing the object A toward the front of the robot 1. The operation shown in FIG. 2(*c*) corresponds to the operation of the second step in the present invention.

Immediately before FIG. 2(*c*), the center of gravity G of the robot 1 is in motion (translational motion) toward the front; therefore, in the state shown in FIG. 2(*c*), the momentum of the object A increases while the momentum of the center of gravity G of the robot 1 decreases, and the object A begins to move forward. In other words, a part or all of the momentum of the center of gravity G of the robot 1 is converted to the momentum of the object A. Therefore, in the state shown in FIG. 2(*c*), the inertial force of the center of gravity G of the robot 1 is generated toward the front of the robot 1, as indicated by an arrow Y2 in FIG. 3(*c*). Further, the center of gravity G is subjected to a reaction force of the force F applied from the robot 1 to the object A, that is, an object reaction force F' (=−F) applied from the object A. Hence, the ZMP is positioned near the center of the supporting polygon S without deflecting to an edge of the supporting polygon S that includes the ground contact surface of the robot 1 (the ground contact surfaces of both feet 6, 6).

Subsequently, as shown in FIG. 2(*d*), the object A runs by itself away from the robot 1. In the example explained in the present embodiment, after the state shown in FIG. 2(*d*), the robot 1 is controlled such that the center of gravity G moves substantially to the center of the supporting polygon S, as observed in a top plan view, and the posture state of the robot 1 eventually becomes as shown in FIG. 2(*e*). In this case, the operations of the leg bodies 3 and the arm bodies 4 of the robot 1 are controlled such that the ZMP is positioned substantially at the center of the supporting polygon S as shown in, for example, FIGS. 3(*d*) and (*e*). In the example shown in FIGS. 3(*d*) and (*e*), no acceleration motion of the center of gravity G (no acceleration motion of the body 2) is being carried out (no inertial force of the center of gravity G is being produced) in the operation states shown in FIGS. 2(*d*) and (*e*), respectively; hence, the ZMP is positioned vertically right below the center of gravity G. After the state shown in FIG. 2(*d*), an external force including an object reaction force (excluding a floor reaction force) will not act on the robot 1, thus making it possible to substantially maintain the ZMP substantially at the center of the supporting polygon S, as described above, without hindrance.

The operation of the robot 1 explained above (the operation for moving the object A by pushing it) allows the ZMP to easily fall within a supporting polygon while restraining a change in the ZMP to a relatively small one. Thus, it is not required to set the feet 6, 6 of both leg bodies 2, 2 such that they land so as to spread longitudinally before starting to push the object A, thus permitting prompt, smooth start of the operation for moving the object A by the robot 1.

A second embodiment of the present invention will now be explained. In the present embodiment, the construction of a robot is the same as that in the aforesaid first embodiment, so that the like reference numerals as those in the first embodiment will be used, and the explanation thereof will be omitted.

The present embodiment differs from the first embodiment only in the operation control of a robot 1 when performing an operation for moving an object A by pushing it by the robot 1. The following will explain the operation control with reference to FIG. 4 and FIG. 5. FIGS. 4(*a*) to (*f*) are side views showing the positional relationship in time series between the object A (a carriage in the illustrated example) and the robot 1, and FIGS. 5(*a*) to (*f*) show in time series the horizontal positions of the center of gravity of the robot 1 and a ZMP in correspondence to FIGS. 4(*a*) to (*f*), respectively. FIGS. 5(*a*) to (*f*) indicate the ZMP by the "x" marks.

First, as shown in FIG. 4(*a*), the robot 1 is set to oppose the object A (such that the object A is right in front of the robot 1), and hands 7, 7 of both arm bodies 4, 4 are placed in contact with the object A. In this case, the hands 7, 7 of both arm bodies 4, 4 are abutted against (brought in contact with) the object A such that a pushing force is not applied to the object A (such that the force applied to the object A from the robot 1 is substantially zero). In this example, both leg bodies 2, 2 of the robot 1 are continuously retained in contact with the ground in a state wherein they are laterally arranged in a line and a travel of the robot 1 is at a halt. In the example explained in the present embodiment, both leg bodies 2, 2 of the robot 1 are laterally arranged in line; however, the ground contact positions of the two feet 6, 6 may be longitudinally shifted.

The state shown in FIG. 4(*a*) is the same state shown in FIG. 2(*a*) in the first embodiment. More specifically, the center of gravity G of the robot 1 is substantially stationary and positioned above the feet 6 as observed in a side view. And in this state, as with the first embodiment, the ZMP of the robot 1 is positioned substantially at the center of a supporting polygon S that includes a ground contact surface of the robot 1 (ground contact surfaces of both feet 6, 6) and vertically below the center of gravity G, as shown in FIG. 5(a).

Subsequently, as shown in FIG. 4(b), with both feet 6, 6 in contact with the ground, the operations of actuators of joints 3a to 3c of both leg bodies 3, 3 are controlled so as to slightly jut the waist (a portion around a hip joint 3a) of the robot 1 toward the front and incline the posture of the body 2 toward the rear. In this case, the operation for jutting the waist of the robot 1 and the operation for inclining the body 2 toward the rear are performed relatively slowly such that inertial forces produced due to the operations will be sufficiently small and that the center of gravity G of the robot 1 will not significantly move in the longitudinal direction from the state shown in FIG. 4(a). At this time, in both arm bodies 4, 4, the operations of the actuators of the joints 4a to 4c of each of the arm bodies 4 are controlled to maintain a state wherein the hands 7 are in contact with the object A in a state wherein an acting force between the hand 7 of each of the arm bodies 4 of the robot 1 and the object A is substantially zero.

Since the operation shown in FIG. 4(b) is performed as described above, the ZMP during the operation is maintained at a position that is substantially at the center of a supporting polygon S and substantially vertically directly below the center of gravity G of the robot 1. In the aforesaid example, the operation shown in FIG. 4(b) has been slowly performed; alternatively, however, an angular acceleration may be generated in the body 2 of the robot 1 or acceleration (translational acceleration) may be generated at the center of gravity G within a range in which the ZMP falls approximately in the vicinity of the center in the supporting polygon S.

Subsequently, as shown in FIG. 4(c), with both feet 6, 6 held in contact with the ground, both leg bodies 3, 3 are actuated (the operations of the actuators of the joints 3a to 3c are controlled) so as to incline the body 2 of the robot 1 toward the front (in a direction in which the body 2 approaches the object A and the direction indicated by an arrow Y3 in FIG. 4(c)) while accelerating the body 2. This imparts an angular momentum about the center of gravity G of the robot 1 to the body 2 (the angular momentum is increased). At this time, however, the operations of the actuators of the joints 4a to 4c are controlled such that both arm bodies 4, 4 do not apply a pushing force to the object A (such that a force applied to the object A from the robot 1 is substantially zero). In other words, both arm bodies 4, 4 are actuated to move the hands 7, 7 of both arm bodies 4, 4 toward the body 2 as much as the body 2 has been moved toward the object A by the operation for inclining the body 2 toward the front. At this time, the center of gravity G of the robot 1 may be set such that it does not move; in the illustrated example, however, it is slightly accelerated toward the front (toward the object A).

In the operational state shown in FIG. 4(c), inclining the body 2 toward the front (an increase in the angular momentum in the direction of the inclination toward the front) generates an inertial force in the opposite direction therefrom (a moment: refer to an arrow Y4 of a dashed line shown in FIG. 5(c)) about the center of gravity G. Incidentally, the arrows of dashed lines in FIG. 5 indicate inertial forces (moments) involved in posture inclining motions of the body 2. In this case, the directions of the inertial forces are in the direction of the forward inclination of the body 2 if the directions of the arrows of dashed lines are in the forward direction, while they are in the direction of the backward inclination of the body 2 if the directions of the arrows of dashed lines are in the backward direction.

Further, in the example of the present embodiment, the center of gravity G of the robot 1 also accelerates forward slightly as described above, causing an inertial force of the center of gravity G to be generated toward the rear of the robot 1, as indicated by an arrow Y5 in FIG. 5(c). An object reaction force that the robot 1 receives is substantially zero. Hence, the ZMP moves toward the rear of a supporting polygon S, as shown in FIG. 5(c). The operation for inclining the body 2 of the robot 1 forward is performed such that the ZMP falls within the supporting polygon S and does not suddenly change.

As described above, the operation illustrated in FIG. 4(c) imparts an angular momentum (angular momentum in the direction of forward inclination) about the center of gravity G to the body 2 of the robot 1 and also imparts a forward momentum (translational momentum) to the center of gravity G. The operation shown in FIG. 4(c) corresponds to the operation of the first step in the second invention or the third invention described above.

Subsequently, as shown in FIG. 4(d), the operation for moving the hands 7, 7 of both arm bodies 4, 4 toward the front (the operation of moving the hands 7, 7 away from the body 2) is begun, and the angular momentum of the body 2 of the robot 1 toward the forward inclination is decreased (the inclining velocity of the body 2 is decelerated) while applying a force F forward to the object A from the robot 1. At this time, the velocity of the forward motion of the center of gravity G of the robot 1 is also reduced. This starts the operation for pushing the object A toward the front of the robot 1. The operation shown in FIG. 4(d) corresponds to the operation of the second step in the second invention or the third invention described above.

Immediately before FIG. 4(d), the motion of forward inclination is implemented to bring the body 2 of the robot 1 close to the object A (having the angular momentum about the center of gravity G). Furthermore, in this example, the center of gravity G of the robot 1 is also subjected to the translational motion forward. Consequently, in the state shown in FIG. 4(d), the angular momentum of the body 2 of the robot 1 is reduced and the momentum of the center of gravity G of the robot 1 is also reduced while the momentum of the object A increases, causing the object A to start moving toward the front of the robot 1. In other words, a part of the angular momentum of the body 2 of the robot 1 and the momentum of the center of gravity G is converted into a momentum of the object A. Hence, in the state shown in FIG. 4(d), an inertial force (moment) is generated in the body 2 of the robot 1 in the direction of forward inclination, as indicated by an arrow Y6 of dashed line in FIG. 5(d), and an inertial force (translational inertial force) is generated at the center of gravity G of the robot 1 toward the front of the robot 1, as indicated by an arrow Y7 in FIG. 5(d). Further, the center of gravity G is subjected to a reaction force of F applied to the object A from the robot 1, i.e., an object reaction force F' (=−F) from the object A. Thus, the ZMP is positioned around the center of the supporting polygon S that includes the ground contact surface of the robot 1 (the ground contact surfaces of both leg bodies 6, 6) without excessively deflecting to an edge of the supporting polygon S, as shown in FIG. 5(d).

Subsequently, as shown in FIG. 4(e), the object A runs by itself away from the robot 1. In the example explained in the present embodiment, after the state shown in FIG. 4(e), the robot 1 is controlled such that the posture of the body 2 is returned to a vertical posture and the center of gravity G is moved substantially to the center of the supporting polygon S as observed in a plan view, as shown in FIGS. 4(e) and (f), and eventually set to the posture state of the robot 1 shown in FIG. 4(f). In this case, the operations of the leg bodies 3 and the arm bodies 4 of the robot 1 are controlled such that the ZMP is positioned substantially at the center of the supporting polygon S, as shown in, for example, FIGS. 5(e) and (f). In the example shown in FIGS. 5(e) and (f), the restoration of the posture of the body 2 to the vertical posture and the movement of the center of gravity G are slowly implemented (hence, hardly producing an inertial force), and ZMP is positioned vertically right below the center of gravity G. After the state shown in FIG. 4(e), the robot 1 is not subjected to an external force that includes an object reaction force (excluding a floor reaction force), thus allowing the ZMP to be maintained substantially at the center of the supporting polygon S without hindrance, as described above.

In the second embodiment, the operation of the robot 1 explained above (the operation for moving the object A by pushing it) allows the ZMP to easily fall within the supporting polygon while restraining a change in the ZMP to a relatively small one by utilizing the angular momentum of the body 2 and the momentum (translational momentum) of the center of gravity G immediately before starting to push the object A. Accordingly, as with the first embodiment, it is not required to set the feet 6, 6 of both leg bodies 2,2 such that they land, longitudinally spreading before starting to push the object A, thus permitting prompt and smooth start of the operation for moving the object A by the robot 1.

In the aforesaid second embodiment, the momentum (translational momentum) has been generated also in the center of gravity G of the robot 1 when the angular momentum is generated in the body 2 immediately before starting to move the object A; alternatively, however, the angular momentum may be generated in the body 2 while holding the center of gravity G stationary.

Further, in the embodiments explained above, the explanations have been given, taking the examples wherein the object A is moved while the feet 6, 6 of both leg bodies 2, 2 are held in contact with the ground, being arranged side by side in the lateral direction; alternatively, however, the object A can be moved in a state wherein the foot 6 of only one leg body 2 is in contact with the ground.

Further, in the aforesaid embodiments, the hands 7, 7 of the arm bodies 4, 4 have been abutted against the object A before moving the object A by pushing it; alternatively, however, the hands 7, 7 of the arm bodies 4, 4 may be abutted against the object A while exercising the body 3 so as to impart a momentum to the center of gravity G of the robot 1 or an angular momentum to the body 2.

Further, in the aforesaid embodiments, the explanations have been given, taking the examples wherein the object A is pushed to move it; however, the present invention can be applied also to a case where the object A is pulled to move it. In this case, the body 2 may be accelerated toward the rear or backward inclination to impart a momentum to the center of gravity G of the robot 1 toward the rear or to impart an angular momentum to the body 2 of the robot 1 toward backward inclination before applying a pulling force to the object A, and then, the pulling force may be applied to the object A from the robot 1.

Moreover, the present invention can be applied also to a case where an object is lifted by the robot 1. In this case, the body 2 of the robot 1 is, for example, tilted forward for the hands 7, 7 of the arm bodies 4, 4 to grasp the object, and in this state, the posture of the body 2 of the robot 1 is raised in an accelerating manner toward the vertical posture while preventing a force in the lifting direction from being applied to the object. Thus, the angular momentum in the direction of backward inclination is generated in the body 2 of the robot 1. In the state wherein the angular momentum has been generated in the body 2 of the robot 1 as described above, the force in the lifting direction may be applied to the object from the arm bodies 4, 4 to lift the object by utilizing the angular momentum.

Industrial Applicability

As described above, the present invention is useful in a case where an operation for moving a wide variety of objects by pushing or pulling or lifting them is performed by a legged mobile robot, such as a bipedal mobile robot, because the invention makes it possible to easily secure the stability of a posture of the robot before and after moving an object.

Brief Description of the Drawings

FIGS. 2(a) to (e) are diagrams of side views showing a positional relationship in time series between an object and a robot in the first embodiment.

FIGS. 3(a) to (e) are diagrams showing in time series the horizontal positions of the center of gravity of the robot 1 and a ZMP in the first embodiment in correspondence to FIGS. 2(a) to (e), respectively.

FIGS. 4(a) to (f) are diagrams of side views showing a positional relationship in time series between an object and a robot in a second embodiment.

Figure 1:
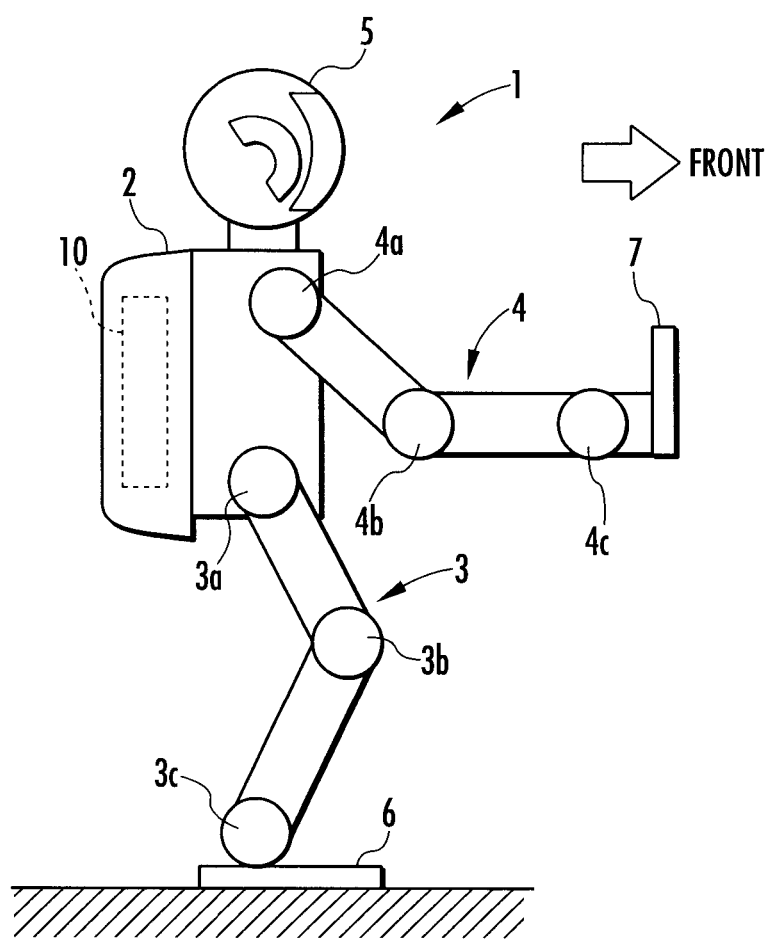
FIG. 1 is a diagram of a side view showing a bipedal mobile robot as a legged mobile robot in a first embodiment of the present invention.
Figure 5A:
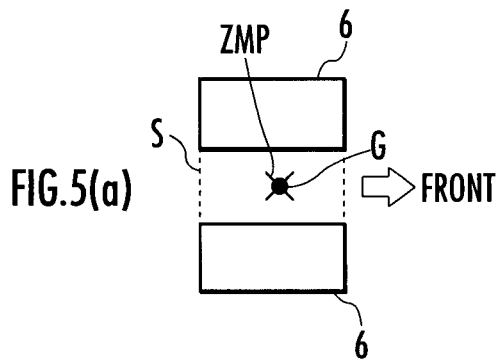
FIGS. 5(a) to (f) are diagrams showing in time series the horizontal positions of the center of gravity of the robot 1 and a ZMP in the second embodiment in correspondence to FIGS. 4(a) to (f), respectively.
Figure 5B:
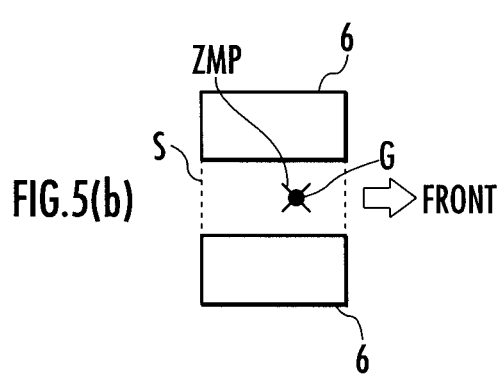
Figure 5C:
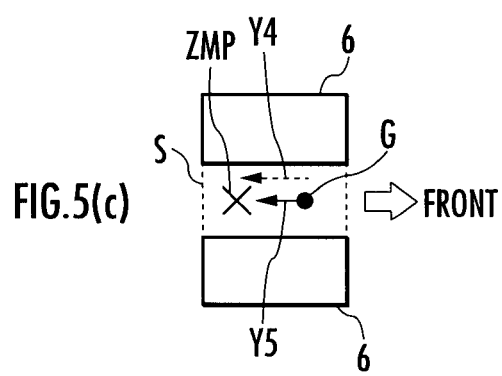
Figure 5D:
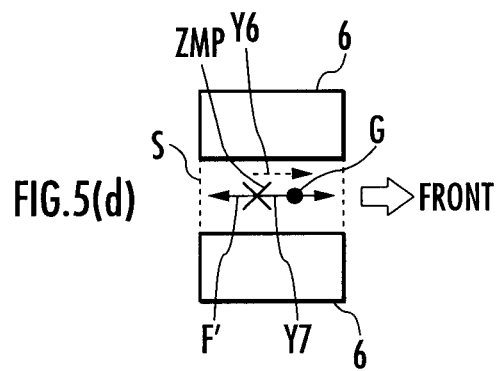
Figure 5E:
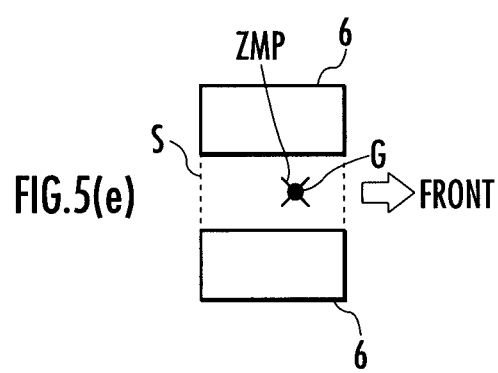
Figure 5F:
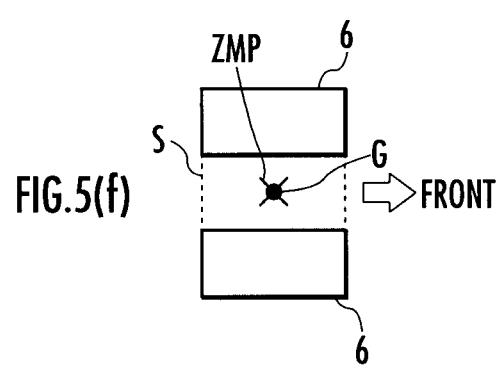

The invention claimed is:

1. A control method for a legged mobile robot for causing a legged mobile robot equipped with a plurality of leg bodies extended from a body thereof to perform an operation for moving an object by the robot, comprising the steps of:
    starting with the robot adjacent to the object and in a stationary position such that a center of gravity of the robot is generally stationary;
    a first step of using a microcomputer for exercising the body of the robot while maintaining feet at distal ends of said leg bodies in a fixed position such that the center of gravity of the robot obtains a momentum in a direction in which the object is to be moved and a ZMP of the robot moves in a direction opposite to the direction in which the object is to be moved while preventing a force from being applied to the object from the robot in a state wherein the robot opposes the object; and
    a second step of using the microcomputer for applying a force to the object, while maintaining said feet in the fixed position, from a predetermined portion provided in the body of the robot so as to start moving the object in a state wherein the momentum has been imparted to the center of gravity.

2. The control method for a legged mobile robot according to claim 1, wherein the predetermined portion is an arm body extended from the body, the arm body being provided with at least one or more joints enabling a distance between a distal portion thereof and the body to be changeable, the control method further comprising a step of using the microcomputer for bringing at least a distal portion of the arm body into contact with the object before the first step, wherein the motion of the body in the first step is carried out while the joint is being operated with at least the distal portion of the arm body in contact with the object.

3. The control method for a legged mobile robot according to claim 2, wherein the step for bringing at least the distal portion of the arm body into contact with the object is carried out in a state wherein a travel of the robot is at a halt.

4. The control method for a legged mobile robot according to claim 1, wherein the number of the leg bodies is two.

5. A control method for a legged mobile robot for causing a legged mobile robot equipped with a plurality of leg bodies extended from a body thereof to perform an operation for moving an object by the robot, comprising the steps of:
 starting with the robot adjacent to the object and in a stationary position such that a center of gravity of the robot is generally stationary;
 a first step of using a microcomputer for exercising the body of the robot while maintaining feet at distal ends of said leg bodies in a fixed position such that the body of the robot obtains an angular momentum about the center of gravity of the robot in a direction in which the object is to be moved and a ZMP of the robot moves in a direction opposite to the direction in which the object is to be moved while preventing a force from being applied to the object from the robot in a state wherein the robot opposes the object; and
 a second step of using the microcomputer for starting to move the object by applying a force to the object, while maintaining said feet in the fixed position, from a predetermined portion provided in the body of the robot in a state wherein the angular momentum has been imparted to the body.

6. The control method for a legged mobile robot according to claim 5, wherein the predetermined portion is an arm body extended from the body, the arm body being provided with at least one or more joints enabling a distance between a distal portion thereof and the body to be changeable, the control method further comprising a step of using the microcomputer for bringing at least a distal portion of the arm body into contact with the object before the first step, wherein the motion of the body in the first step is carried out while the joint is being operated with at least the distal portion of the arm body in contact with the object.

7. The control method for a legged mobile robot according to claim 6, wherein the step for bringing at least the distal portion of the arm body into contact with the object is carried out in a state wherein a travel of the robot is at a halt.

8. The control method for a legged mobile robot according to claim 5, wherein the number of the leg bodies is two.

9. A control method for a legged mobile robot for causing a legged mobile robot equipped with a plurality of leg bodies extended from a body thereof to perform an operation for moving an object by the robot, comprising the steps of:
 starting with the robot adjacent to the object and in a stationary position such that a center of gravity of the robot is generally stationary;
 a first step of using a microcomputer for exercising the body of the robot while maintaining feet at distal ends of said leg bodies in a fixed position such that the center of gravity of the robot obtains a momentum in a direction in which the object is to be moved and also the body of the robot obtains an angular momentum in the direction in which the object is to be moved and a ZMP of the robot moves in a direction opposite to the direction in which the object is to be moved while preventing a force from being applied to the object from the robot in a state wherein the robot opposes the object; and
 a second step of using the microcomputer for starting to move the object by applying a force to the object, while maintaining said feet in the fixed position, from a predetermined portion provided in the body of the robot in a state wherein the momentum has been imparted to the center of gravity of the robot and the angular momentum has been imparted to the body thereof.

10. The control method for a legged mobile robot according to claim 9, wherein the predetermined portion is an arm body extended from the body, the arm body being provided with at least one or more joints enabling a distance between a distal portion thereof and the body to be changeable, the control method further comprising a step of using the microcomputer for bringing at least a distal portion of the arm body into contact with the object before the first step, wherein the motion of the body in the first step is carried out while the joint is being operated with at least the distal portion of the arm body in contact with the object.

11. The control method for a legged mobile robot according to claim 10, wherein the step for bringing at least the distal portion of the arm body into contact with the object is carried out in a state wherein a travel of the robot is at a halt.

12. The control method for a legged mobile robot according to claim 9, wherein the number of the leg bodies is two.

* * * * *